United States Patent
Ham et al.

(10) Patent No.: US 9,719,817 B2
(45) Date of Patent: Aug. 1, 2017

(54) WHEEL FIXING UNIT FOR CAR SENSOR CALIBRATION AND CALIBRATION DEVICE USING THE SAME

(71) Applicant: MANDO CORPORATION, Pyeongtaek-si, Gyeonggi-do (KR)

(72) Inventors: Hyung Suk Ham, Yongin-si (KR); Ji Hoon Cho, Seoul (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 257 days.

(21) Appl. No.: 14/639,422

(22) Filed: Mar. 5, 2015

(65) Prior Publication Data

US 2015/0253161 A1    Sep. 10, 2015

(30) Foreign Application Priority Data

Mar. 5, 2014  (KR) ........................ 10-2014-0025824

(51) Int. Cl.
| | | |
|---|---|---|
| *G01D 21/00* | (2006.01) | |
| *G01D 18/00* | (2006.01) | |
| *G01S 7/40* | (2006.01) | |
| *G01S 13/93* | (2006.01) | |

(52) U.S. Cl.
CPC ............ *G01D 18/00* (2013.01); *G01S 7/4026* (2013.01); *G01S 13/931* (2013.01); *G01S 2013/9364* (2013.01)

(58) Field of Classification Search
CPC .... G01D 18/00; G01F 13/931; G01N 33/346; G01N 29/11; G01N 29/265; G01H 3/00
USPC ....... 73/866.5, 618, 159, 596, 633, 584, 570
See application file for complete search history.

(56) References Cited

U.S. PATENT DOCUMENTS

2012/0320370 A1*  12/2012  Giacomini ......... G01B 11/2755
356/139.09

FOREIGN PATENT DOCUMENTS

| CN | 103250069 A | 8/2013 |
|---|---|---|
| DE | 102004026044 B3 | 12/2005 |
| DE | 102006035534 A1 | 1/2008 |
| DE | 102009009046 A1 | 10/2009 |

(Continued)

OTHER PUBLICATIONS

Werner, Device for attaching a laser and a method of adjusting a distance control system, Feb. 6, 2008, EP1884796.*

(Continued)

*Primary Examiner* — Lisa Caputo
*Assistant Examiner* — Nigel Plumb
(74) *Attorney, Agent, or Firm* — Hauptman Ham, LLP

(57) ABSTRACT

A wheel fixing unit includes: a body; a plurality of wheel connectors protruding forward from the body and connected to a tool connection hole in a wheel of a vehicle; and a cable connector protruding rearward from the body and including a connection terminal formed on a protruding end side such that a cable is connectable thereto. A calibration device using the wheel fixing unit includes: wheel fixing units respectively coupled to left and right wheels of a vehicle; a target board installed spaced apart in a direction corresponding to a vehicle body and configured such that a transmission signal of a sensor mounted on a front or rear surface of the vehicle body is reflected by a reflector and is incident on the sensor; and an interval maintaining cable connected to one end of the wheel fixing unit and one of the both sides of the target board.

10 Claims, 5 Drawing Sheets

(56) References Cited

FOREIGN PATENT DOCUMENTS

| | | |
|---|---|---|
| EP | 1016873 A2 | 7/2000 |
| EP | 1455161 A1 | 9/2004 |
| EP | 1884796 A1 | 2/2008 |
| KR | 1020130113102 A | 10/2013 |

OTHER PUBLICATIONS

Chinese Office Action mailed on Sep. 27, 2016 for Chinese Patent Application No. 201510098117.2, citing the above reference(s).

* cited by examiner

WHEEL FIXING UNIT FOR CAR SENSOR CALIBRATION AND CALIBRATION DEVICE USING THE SAME

CROSS-REFERENCE(S) TO RELATED APPLICATION

This application claims the benefit of Korean Patent Application No. 10-2014-0025824, filed on Mar. 5, 2014, in the Korean Intellectual Property Office, the contents of which are incorporated herein by reference in its entirety.

BACKGROUND OF THE INVENTION

Field of the Invention

The present invention relates to a wheel fixing unit for car sensor calibration and a calibration device using the same, and more particularly, to a wheel fixing unit for car sensor calibration, which can be installed and removed easily and quickly without separate cable connection structure, and a calibration device using the same.

Description of the Related Art

Recent vehicles have become more intelligent so as to provide more improved stability and convenience.

Regarding the intelligent vehicles, various vehicle control systems are applied. Examples of the vehicle control systems include an Adaptive Cruise Control (ACC) and Stop & Go for following a forward vehicle, a Blind Spot Detection (BSD) for detecting a blind spot of a vehicle, a Lane Change Assist (LCA) for safe lane change, a Pre-Crash Safety (PCS) for preventing a collision with a forward vehicle, a Collision Avoidance System (CAS), and a Parking Assist (PA).

Various vehicle control systems according to the related art use radar sensors, ultrasonic sensors, and the like, which transmit and receive signals, so as to sense an object (including vehicles and persons) around a vehicle.

Such sensors need to have an accurate alignment state so as to accurately sense an object, and a sensor alignment operation is performed for accurate sensing.

In the conventional sensor alignment adjustment operation, a reflection signal of an object (target board or the like) reflecting a transmission signal is received, characteristics of the transmission signal and the reflection signal are analyzed, and sensor alignment is adjusted based on the analysis result.

However, in the related art, in a case where alignment is adjusted under conditions other than mass production line, a position of a vehicle and a position reference point of a target board do not exist, and thus, it is difficult to ensure accuracy of alignment adjustment.

Therefore, there is proposed a technology that can accurately adjust sensor alignment even under conditions other than mass production line and achieve easy and quick installation in a wheel of a vehicle.

As the prior art document related to the present invention, Korean Patent Application Publication No. 10-2013-0113102 (Oct. 15, 2013) discloses a method and apparatus for horizontal alignment calibration of vehicle radars.

SUMMARY OF THE INVENTION

The present invention is directed to provide a wheel fixing unit for a vehicle sensor calibration and a calibration device using the same, in which an interval maintaining cable is coupled by coupling the wheel fixing unit to a tool connection hole formed in a wheel in a male-female connection manner, so that installation is achieved easily and rapidly and a separate cable connection structure is not needed.

In addition, the present invention is directed to a wheel fixing unit for a vehicle sensor calibration and a calibration device using the same, in which a packing having elasticity is installed on an outer periphery of a wheel connector and, when the wheel connector is coupled to a tool connection hole, it is possible to prevent the wheel connector from being easily released to the outside or being shaken.

According to the present invention, a wheel fixing unit for a vehicle sensor calibration includes: a body; a plurality of wheel connector protruding forward from the body and connected in a state of being inserted into a tool connection hole formed in a wheel of a vehicle; and a cable connector protruding rearward from the body and including a connection terminal formed on a protruding end side such that a cable is connectable thereto.

The wheel connectors may have a cylindrical shape with a hollow portion opened forward.

A ring-shaped groove may be formed along a circumference on outer peripheries of the wheel connectors, and a ring-shaped packing having an elastic force to contact an inner periphery of the tool connection hole may be coupled to the groove.

A slit having a length along a longitudinal direction may be concavely formed on outer peripheries of the wheel connectors.

A front end of the cable connector may be inserted in male-female correspondence with respect to a rear surface of the body and may be locked rotatably around a horizontal center of rotation.

According to the present invention, a calibration device using a wheel fixing unit for a vehicle sensor calibration includes: wheel fixing units respectively coupled to left and right wheels of a vehicle; a target board installed spaced apart in a direction corresponding to a vehicle body and configured such that a transmission signal of a sensor mounted on a front or rear surface of the vehicle body is reflected by a reflector and is incident on the sensor; and an interval maintaining cable connected to one end of the wheel fixing unit and one of the both sides of the target board and maintaining a distance between the vehicle body and the target board to a set interval.

The vehicle fixing unit may include: a body; a plurality of wheel connector protruding forward from the body and connected in a state of being inserted into a tool connection hole formed in a wheel of a vehicle; and a cable connector protruding rearward from the body and including a connection terminal formed on a protruding end side such that a cable is connectable thereto.

A ring-shaped groove may be formed along a circumference on outer peripheries of the wheel connectors, and a ring-shaped packing having an elastic force to contact an inner periphery of the tool connection hole may be coupled to the groove.

A slit having a length along a longitudinal direction may be concavely formed on outer peripheries of the wheel connectors.

A front end of the cable connector may be inserted in male-female correspondence with respect to a rear surface of the body and may be locked rotatably around a horizontal center of rotation.

DETAILED DESCRIPTION OF EXEMPLARY EMBODIMENTS

Figure 1:
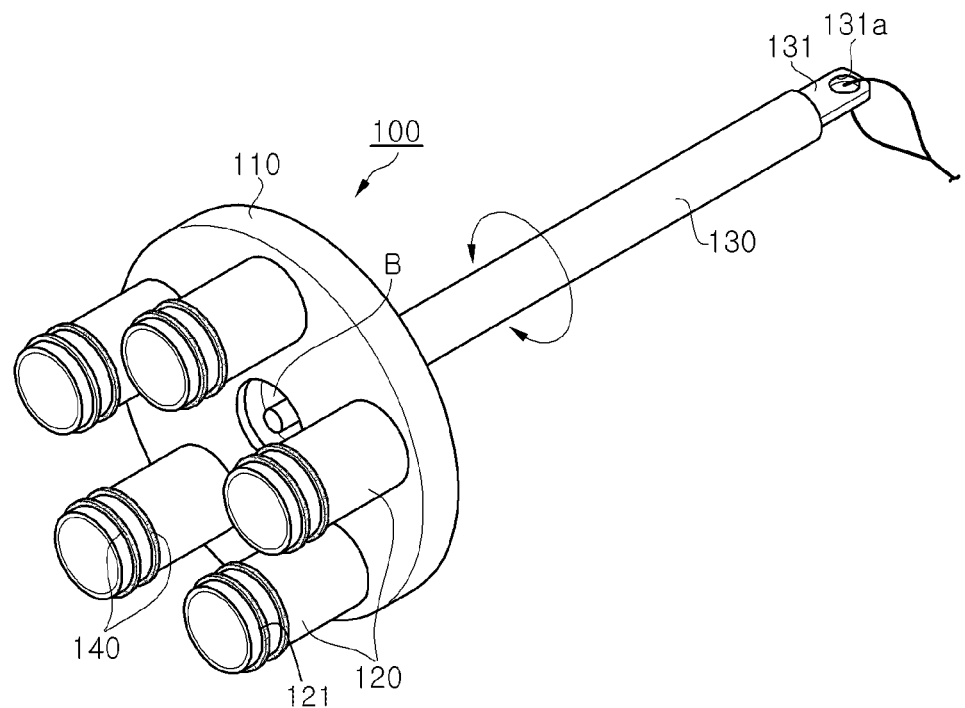
FIG. 1 is a perspective view showing a wheel fixing unit for a vehicle sensor calibration according to the present invention.

Hereinafter, exemplary embodiments of the present invention will be described in detail with reference to the accompanying drawings.

The advantages and features of the present invention and methods for achieving them will become more apparent from the following embodiments that are described in detail in conjunction with the accompanying drawings.

The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like elements throughout this disclosure.

In addition, in the following description, detailed descriptions of well-known technologies will be omitted since they would unnecessarily obscure the subject matters of the present invention.

Figure 2:
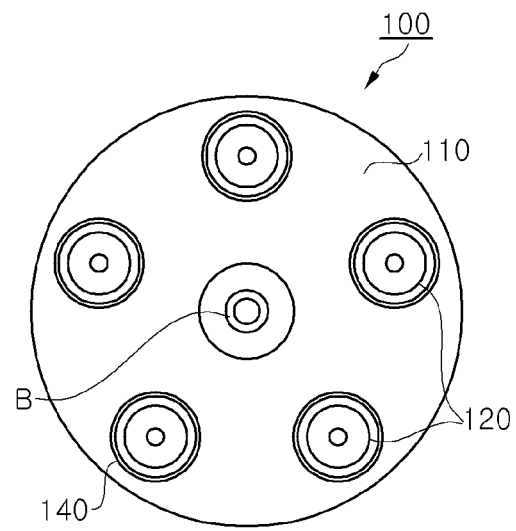
FIG. 2 is a front view showing the wheel fixing unit for the vehicle sensor calibration according to the present invention.

FIG. 1 is a perspective view showing a wheel fixing unit for a vehicle sensor calibration according to the present invention. FIG. 2 is a front view showing the wheel fixing unit for the vehicle sensor calibration according to the present invention.

Figure 3:
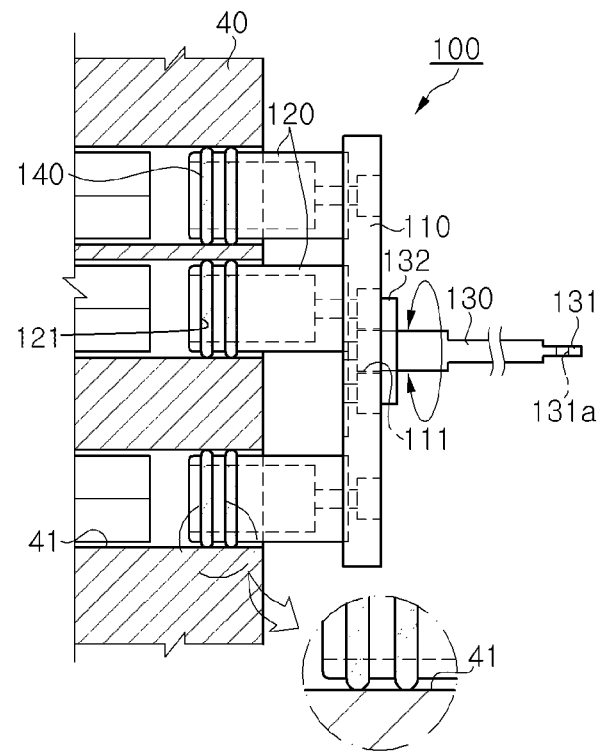
FIG. 3 is a side view showing the wheel fixing unit for the vehicle sensor calibration according to the present invention.
Figure 4:
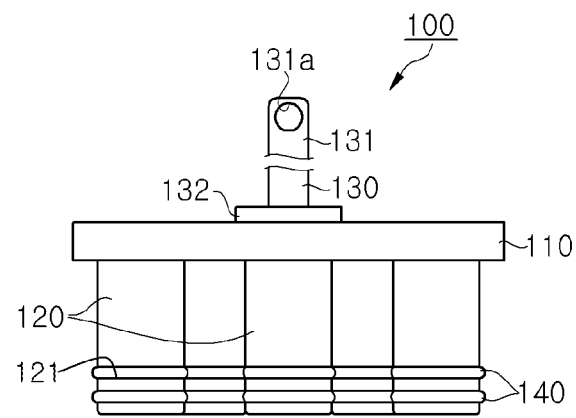
FIG. 4 is a plan view showing the wheel fixing unit for the vehicle sensor calibration according to the present invention.
Figure 5:
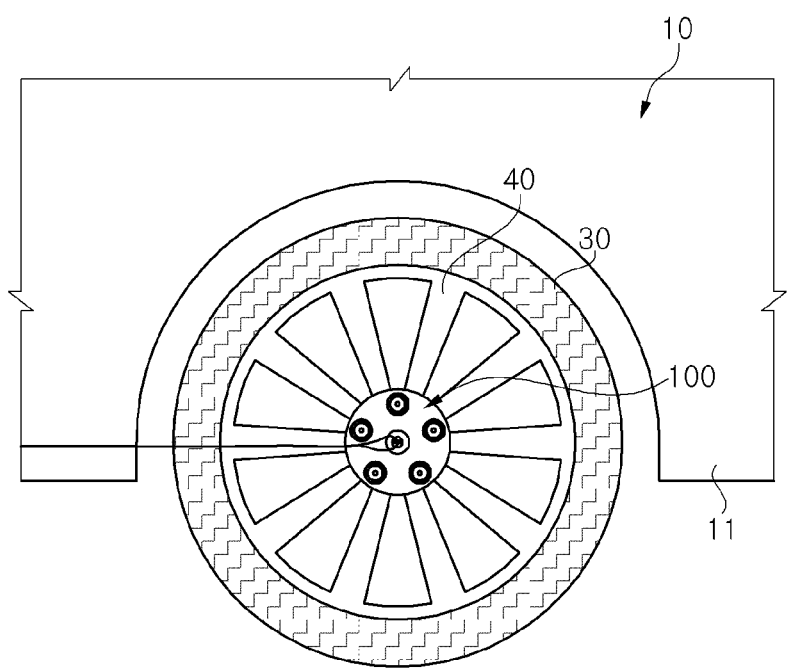
FIG. 5 is a bottom view showing a state in which the wheel fixing unit for the vehicle sensor calibration according to the present invention is coupled to a wheel.

FIG. 3 is a side view showing the wheel fixing unit for the vehicle sensor calibration according to the present invention. FIG. 4 is a plan view showing the wheel fixing unit for the vehicle sensor calibration according to the present invention.

Referring to FIGS. 1 to 4, a wheel fixing unit 100 for a vehicle sensor calibration according to an embodiment of the present invention includes a body 110, wheel connectors 120, and a cable connector 130.

First, the body 110 is coupled to one surface of each of left and right wheels 40 by the wheel connectors 120 to be described below.

The body 110 may have a disk shape, and the center of the body 110 and the center of the wheel 40 may be positioned on the same axis.

A through-hole 111, through which a front end of the cable connector 130 passes, may be formed in the center of the body 110.

As shown in FIG. 3, the front end of the cable connector 130 passes through the through-hole 111 by a predetermined length.

As shown in FIG. 1, the wheel connector 120 protrudes forward from the body 110, and the wheel connector 120 is coupled in a state of being inserted into a tool connection hole 41 formed in the wheel 40 of the vessel 10.

The wheel connectors 120 protrude in a cylindrical shape so as to be correspondingly inserted into the tool connection hole 41 formed on one surface of the wheel 40.

It is obvious that the wheel connectors 120 may be formed to have any shape as long as the shape of the wheel connectors 120 corresponds to the shape of the tool connection hole 41.

The wheel connector 120 may be hollow. For example, the wheel connector 120 may be hollow frontward.

In addition, ring-shaped grooves 121 may be formed in the outer peripheries of the wheel connectors 120 along the circumstances thereof.

In the groove 121, a ring-shaped packing 140 having an elastic force may be provided to contact the inner periphery of the tool connection hole 41.

The packing 140 may be close contact with the inner periphery of the tool connection hole 41 and may be made of a material, such as a rubber or a synthetic resin, which has a predetermined frictional force and elastic force.

A longitudinal cross-section of the packing 140 may have a circular or rectangular shape, and the thickness of the packing 150 may be variously applied.

In addition, a plurality of packings 140 may be arranged along a longitudinal direction of the wheel connector 120. The packing 140 may have a diameter that further protrudes than an outer diameter of the wheel connector 120.

Figure 6:
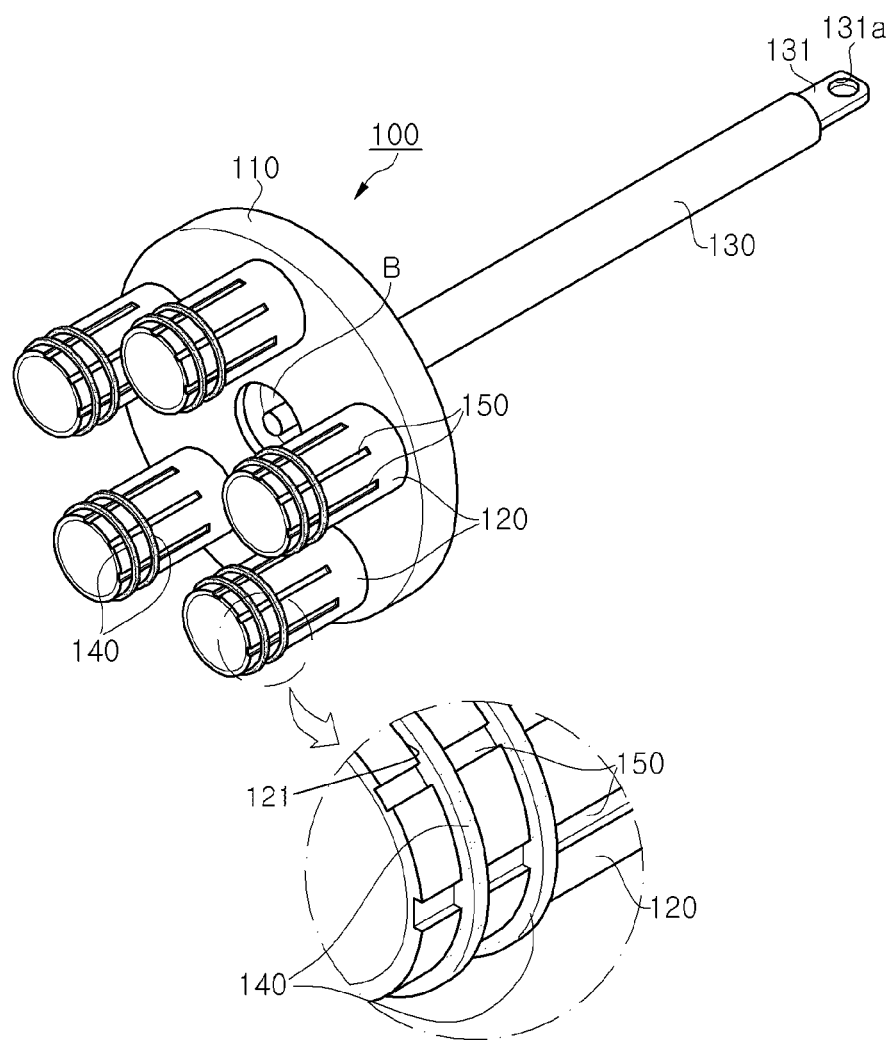
FIG. 6 is a perspective view showing a state in which a slit is formed in a wheel connector of the wheel fixing unit for the vehicle sensor calibration according to the present invention.

In addition, as shown in FIG. 6, a concave slit 150 having a length along a longitudinal direction may be formed in the outer periphery of the wheel connector 120.

A plurality of slits 150 may be formed along the periphery of the wheel connector 120, and the shape of the slit 150 may be variously applied.

When the wheel connector 120 is inserted into the tool connection hole 41 of the wheel 40, the slit 150 serves as a passage through which air of the tool connection hole 41 is discharged to the outside.

Thus, since air is smoothly discharged through the slit 150 to the outside, the wheel connector 120 can be easily inserted into or removed from the tool connection hole 41.

The cable connector 130 protrudes rearward from the body 110, and a connection terminal 131 may be provided such that an interval maintaining cable 300 can be coupled thereto.

The cable connector 130 may have a beam shape having the same central axis as the center of rotation of the wheel 40.

A connection hole 131a may be formed in the connection terminal 131 such that one end of the interval maintaining cable 300 to be described below can be coupled thereto.

In addition, a locking protrusion 132 to be locked to a rear end of the through-hole 111 together with a connection member B may be formed with a larger diameter on the cable connector 130.

The locking protrusion 132 is positioned in close contact with the rear surface of the body 110 and is locked and supported such that the cable connector 130 is not moved forward.

In addition, the front end of the cable connector 130 may pass through and connect to the through-hole 111 rotatably around a horizontal central of rotation.

In this state, the connection member B may be screwed to the front end of the cable connector 130 protruding in the front direction of the through-hole 111.

At this time, the connection member B may be coupled such that the cable connector 130 is rotated and the connection member B is locked without pressing the front surface of the body 110.

As such, since the connection member B is locked to the front surface of the body 110 and the locking protrusion 132 is locked to the rear surface of the body 110, the cable connector 130 can be rotated in a horizontal direction without moving in an axial direction.

Hereinafter, a calibration apparatus using a wheel fixing unit for a vehicle sensor calibration according to another embodiment of the present invention will be described, and the same elements as those described above will not be repeatedly described.

Figure 7:
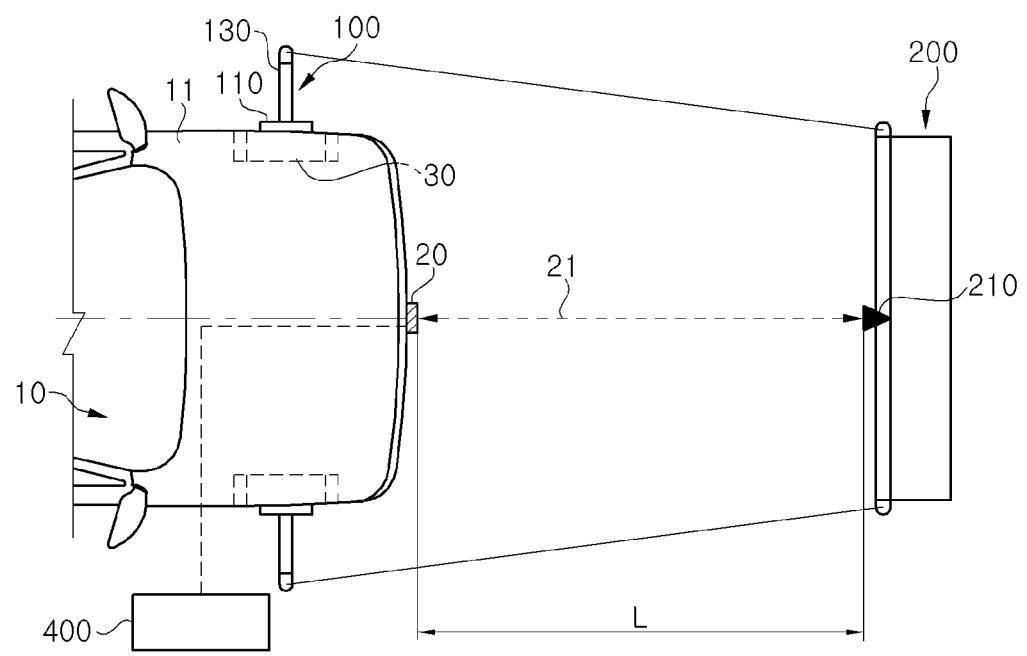
FIG. 7 is a diagram view showing a calibration device using the wheel fixing unit for the vehicle sensor correction according to the present invention.

FIG. 7 is a perspective view showing a calibration device using a wheel fixing unit for a vehicle sensor calibration according to the present invention.

Referring to FIG. 7, the calibration device using the wheel fixing unit for the vehicle sensor calibration according to another embodiment of the present invention includes a wheel fixing unit 100, a target board 200, and an interval maintaining cable 300.

First, the wheel fixing unit 100 is coupled to each of left and right wheels 40 of a vehicle. The wheel fixing unit 100 may include a body 110, a wheel connector 120, and a cable connector 130.

The body 110 is coupled to one surface of each of the left and right wheels 40 of the vehicle 10, and one or more wheel connectors 120 protrude forward from the body 110.

The wheel connector 120 protrudes rearward from the body 110, and the wheel connector 120 is coupled in a state of being inserted into a tool connection hole 41 formed in each of the left and right wheels 40 of the vessel 10.

The cable connector 130 protrudes rearward from the body 110, and a connection terminal 131 may be provided such that the interval maintaining cable 300 can be coupled thereto.

The target board 200 is installed spaced apart from a vehicle body 11 in a corresponding direction, and a reflector 210 is installed on a front surface of the target board 200 to reflect a signal of a sensor 20.

In this state, the target board 200 make a signal 21 be incident on the sensor 20 by reflecting a transmission signal of the sensor 20 mounted on the front or rear surface of the vehicle body 11 to the reflector 210.

The sensor 20 installed on the front surface (front bumper, etc.) or the rear surface (rear bumper, etc.) of the vehicle body 11 may be a radar sensor, an ultrasonic sensor, or the like which senses an object such as the vehicle 10 or persons.

When the sensor 20 is installed on the front or rear surface of the vehicle and senses a vehicle or a person within a set distance, the sensor 20 can transmit a sense signal to a control unit 400 of the vehicle 10.

The control unit 400 may store a reference position and a reference interval for zero-setting the sensor 20.

The control unit 400 may analyze a difference value between a signal reflected from the reflector 210 and incident on the sensor 20 and a preset reference signal value.

Then, the control unit 400 may display the difference value on the outside so as to allow an operator to check the difference value.

In addition, the control unit 400 may include a sensor signal adjustment unit (not shown) for adjusting a signal of the sensor 20 based on requirements for an input mode among requirements for each preset mode, and a radar transmission/reception unit (not shown) for transmitting the signal of the sensor 20 through an antenna.

The reflector 210 may be movably installed corresponding to a position of the sensor 20 installed one the front or rear surface of the vehicle body 11.

For this purpose, the reflector 210 may be coupled along the front surface of the target board 200 by using a separate connection member.

The interval maintaining cable 300 may have a predetermined length, and both ends of the interval maintaining cable 300 may be coupled to the connection hole 131a of the connection terminal 131 and each of the left and right sides of the target board 200.

For this purpose, separate connection members may be further provided on the left and right sides of the target board 200.

In this state, the interval maintaining cable 300 maintains a distance between the vehicle body 11 and the target board 200 to a preset interval L.

The interval maintaining cables 300 have the same length when the sensor 20 is positioned at the center of the vehicle body 11 and the reflector 210 is disposed at the center of the target board 200.

The interval maintaining cables 300 may be made of a material such as a metal or a synthetic resin.

As a result, the interval maintaining cables 300 may be coupled by male-female connection corresponding to the tool connection hole 41 formed in the wheel 40.

Therefore, the installation is easy and rapid and a separate cable connection structure is not needed, thus reducing time and cost involved in the alignment adjustment operation.

The packing 140 having elasticity is installed in the outer periphery of the wheel connector 120. Therefore, when the wheel connector 120 is coupled to the tool connection hole 41, it is possible to prevent the wheel connector 120 from being easily released to the outside or being shaken.

In addition, the slit 150, through which air can move, is formed in the outer periphery of the wheel connector 120. Therefore, when the wheel connector 120 is installed or removed, it is unnecessary to apply a large force to the wheel connector 120, thereby facilitating the installation and removal of the wheel connector 120.

Furthermore, the cable connector 130 is rotatably installed in the wheel connector 120. Therefore, even when the connection state of the wheel connector 120 and the wheel 40 is changed, it is possible to constantly maintain the connection state of the connection terminal of the vehicle 10 and the interval maintaining cable 300.

According to the present invention, since the interval maintaining cable is coupled by coupling the wheel fixing unit to the tool connection hole formed in the wheel in the male-female connection manner, the installation is achieved easily and rapidly and a separate cable connection structure is not needed. Thus, much time and cost are not involved in the alignment adjustment operation.

The packing having elasticity is installed in the outer periphery of the wheel connector. Therefore, when the wheel connector is coupled to the tool connection hole, it is possible to prevent the wheel connector from being easily released to the outside or being shaken.

In addition, the slit, through which air can move, is formed in the outer periphery of the wheel connector. Therefore, when the wheel connector is installed or removed, it is unnecessary to apply a large force to the wheel connector, thereby facilitating the installation and removal of the wheel connector.

Furthermore, the cable connector is rotatably installed in the wheel connector. Therefore, even when the connection state of the wheel connector and the wheel is changed, it is possible to constantly maintain the connection state of the connection terminal of the vehicle and the interval maintaining cable.

The wheel fixing unit for the vehicle sensor calibration and the calibration device sing the same according to the present invention have been described, but it is obvious that various modifications can be made without departing from the scope of the present invention.

Therefore, the scope of the present invention should not be defined not by the detailed description of the embodiments but by the appended claims and their equivalents.

DESCRIPTION OF REFERENCE NUMERAL

| | |
|---|---|
| 10: Vehicle | 11: Vehicle body |
| 20: Sensor | 21: Signal |
| 30: Wheel | 40: Wheel |
| 41: Tool connection hole | 100: Wheel fixing unit |
| 110: Body | 111: Through-hole |
| 120: Wheel connector | 121: groove |
| 130: Cable connector | 131: Connection terminal |
| 131a: Connection hole | 132: Locking protrusion |
| 140: Packing | 150: Slit |
| 200: Target board | 210: Reflector |
| 300: Interval maintaining cable | 400: Control unit |
| B: Connection member | L: Set interval |

What is claimed is:

1. A wheel fixing unit for a vehicle sensor calibration, the unit comprising:
    a body;
    a plurality of wheel connectors protruding forward from the body and connected in a state of being inserted into a tool connection hole formed in a wheel of a vehicle; and
    a cable connector protruding rearward from the body and including a connection terminal formed on a protruding end side such that a cable is connectable thereto,
    wherein each of the wheel connectors has a cylindrical shape having a hollow portion opened forward, and
    wherein the cylindrical shape comprises:
        a plurality of ring-shaped grooves formed along a circumference on outer peripheries of the cylindrical shape; and
        a plurality of ring-shaped packings having an elastic force to contact an inner periphery of the tool connection hole, and coupled to the groove.

2. The wheel fixing unit of claim 1, wherein the cylindrical shape comprises a plurality of concave slits having a length along a longitudinal direction, and formed on outer peripheries of the cylindrical shape.

3. The wheel fixing unit of claim 1, wherein a front end of the cable connector is inserted in male-female correspondence with respect to a rear surface of the body and is locked rotatably around a horizontal center of rotation.

4. A calibration device using a wheel fixing unit for a vehicle sensor calibration, the calibration device comprising:
    wheel fixing units respectively coupled to left and right wheels of a vehicle;
    a target board installed spaced apart in a direction corresponding to a vehicle body and configured such that a transmission signal of a sensor mounted on a front or rear surface of the vehicle body is reflected by a reflector and is incident on the sensor; and
    an interval maintaining cable connected to one end of the wheel fixing unit and one of the both sides of the target board and maintaining a distance between the vehicle body and the target board to a set interval,
    wherein the vehicle fixing unit comprises:
        a body;
        a plurality of wheel connectors protruding forward from the body and connected in a state of being inserted into a tool connection hole formed in a wheel of a vehicle; and
        a cable connector protruding rearward from the body and including a connection terminal formed on a protruding end side such that a cable is connectable thereto,
    wherein each of the wheel connectors has a cylindrical shape having a hollow portion opened forward, and
    wherein the cylindrical shape comprises:
        a plurality of ring-shaped grooves formed along a circumference on outer peripheries of the cylindrical shape; and
        a plurality of ring-shaped packings having an elastic force to contact an inner periphery of the tool connection hole, and coupled to the groove.

5. The calibration device of claim 4, wherein the cylindrical shape comprises a plurality of concave slits having a length along a longitudinal direction, and formed on outer peripheries of the cylindrical shape.

6. The calibration device of claim 4, wherein a front end of the cable connector is inserted in male-female correspondence with respect to a rear surface of the body and is locked rotatably around a horizontal center of rotation.

7. The wheel fixing unit of claim 1, wherein the body has a disc-shape.

8. The wheel fixing unit of claim 7, wherein the wheel connectors are circularly disposed on the disc-shape body.

9. The wheel fixing unit of claim 4, wherein the body has a disc-shape.

10. The wheel fixing unit of claim 9, wherein the wheel connectors are circularly disposed on the disc-shape body.

* * * * *